No. 895,515. PATENTED AUG. 11, 1908.
E. M. TINGLEY.
DYNAMO ELECTRIC MACHINE.
APPLICATION FILED APR. 4, 1906.
3 SHEETS—SHEET 1.
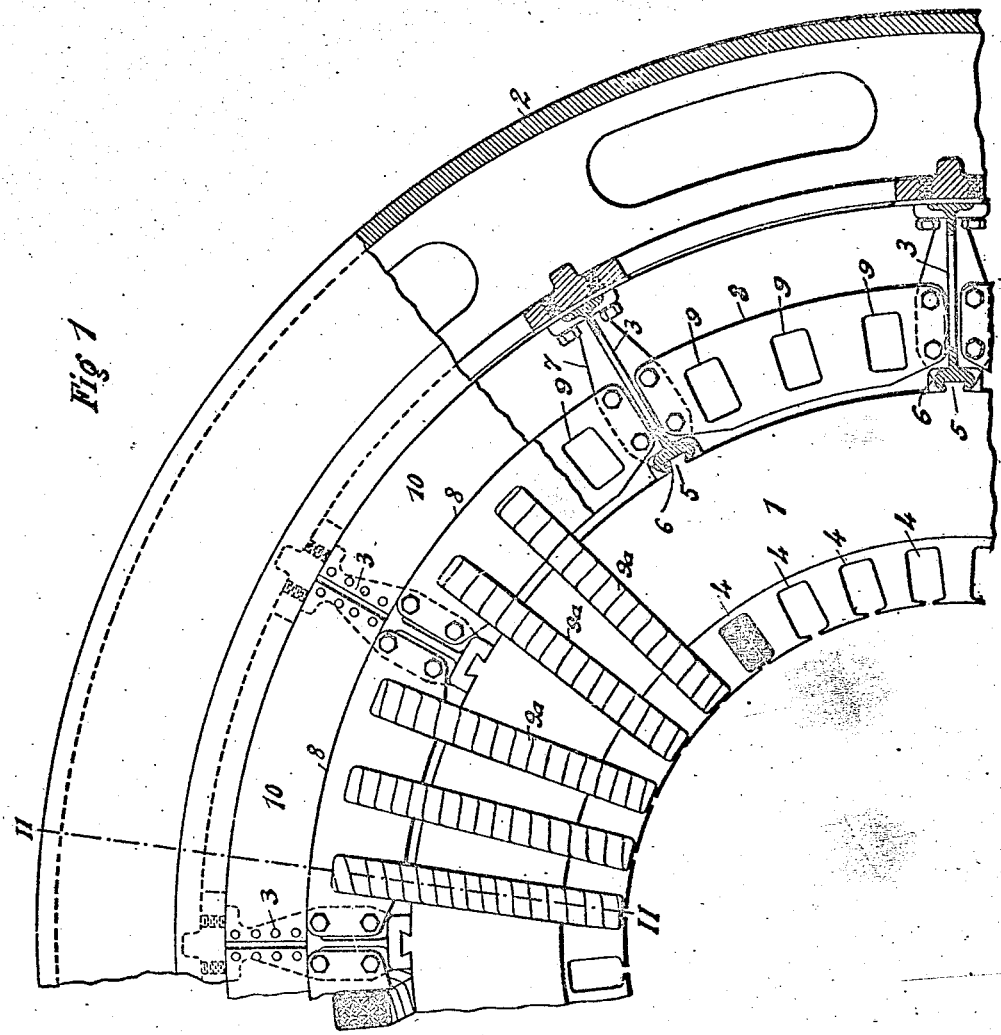
WITNESSES:
Camille Boulin
R. J. Dearborn
INVENTOR
Egbert M. Tingley
BY
Shirley Clean
ATTORNEY

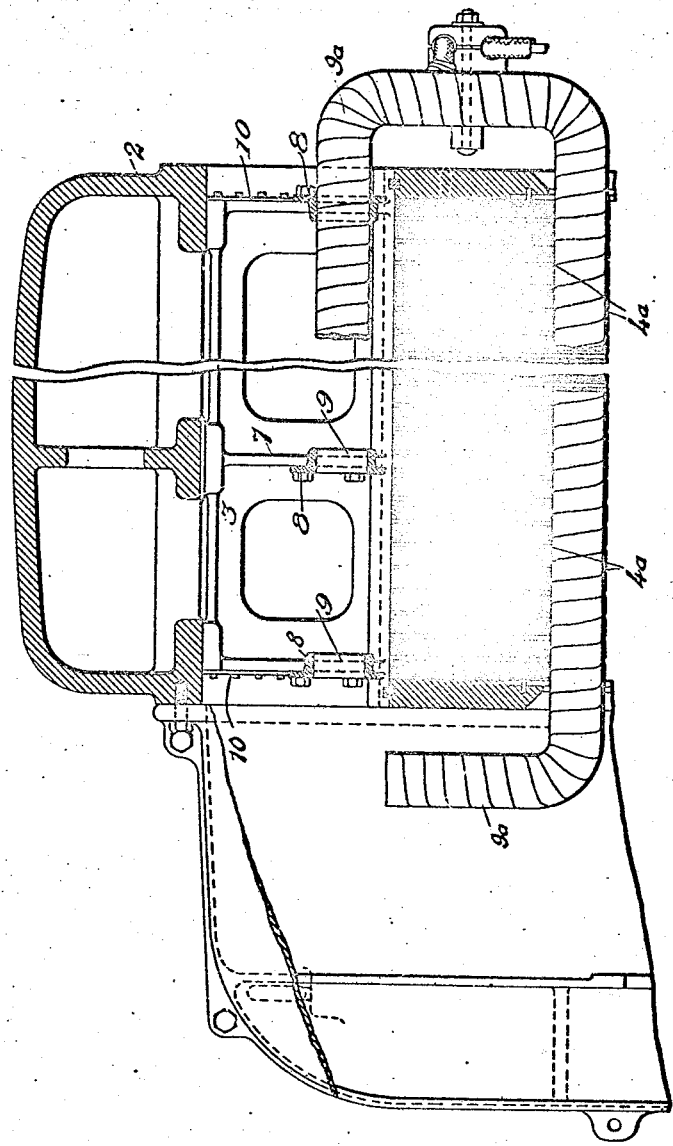

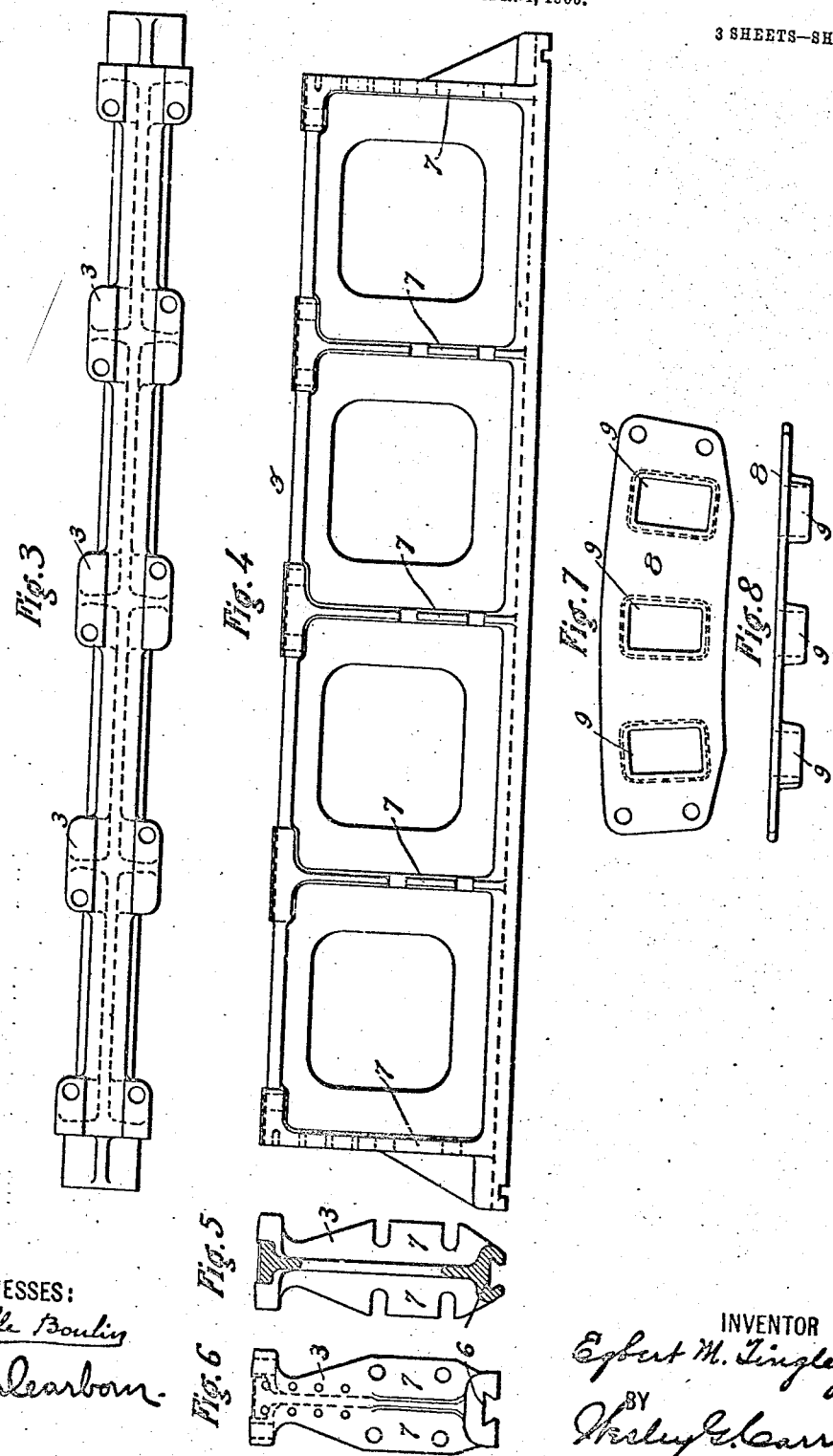

UNITED STATES PATENT OFFICE.

EGBERT M. TINGLEY, OF PITTSBURG, PENNSYLVANIA, ASSIGNOR TO WESTINGHOUSE ELECTRIC & MANUFACTURING COMPANY, A CORPORATION OF PENNSYLVANIA.

DYNAMO-ELECTRIC MACHINE.

No. 895,515.     Specification of Letters Patent.     Patented Aug. 11, 1908.

Application filed April 4, 1906. Serial No. 309,909.

*To all whom it may concern:*

Be it known that I, EGBERT M. TINGLEY, a citizen of the United States, and a resident of Pittsburg, in the county of Allegheny and State of Pennsylvania, have invented a new and useful Improvement in Dynamo-Electric Machines, of which the following is a specification.

My invention relates to dynamo-electric machines and it has for its object to provide an improved stationary armature structure for such machines as are adapted to operate at relatively high speeds and are wound for a relatively small number of poles, such as two, four or six, but which may be embodied in machines having eight or more poles.

Alternating current generators which are adapted to be driven by steam turbines or other high speed driving engines have generally comprised rotating field members having a small number of poles, usually two or four, and stationary armature members, the windings of which were of the drum type and were located in suitable slots near their inner cylindrical core surfaces. The coils of these windings, by reason of the small number of poles, necessarily comprise long, end-connecting portions, the two parts of a single coil being located in slots which are usually widely separated and are substantially opposite each other in bipolar machines. When a machine of this type is completely wound, the portions of the coils not located in the slots are necessarily overlapped by a large proportion of the total number of coils so that it is a very arduous and expensive task, involving a considerable length of time, to repair a single inside coil in case its insulation is punctured or other defects develop. Furthermore, on account of the length and weight of the end connections and also the tendency for the coils to become distorted when the winding becomes short-circuited, or severe electro-magnetic strains are imposed by external short-circuits or for other reasons, it is necessary to provide adequate supports for these portions of the winding. Difficulty is also experienced in providing suitable ventilation for the end connections for stationary drum wound armatures since they are massed in order to reduce to a minimum the large amount of space necessarily occupied by this portion of the winding.

According to my present invention, the supporting frame for the laminated armature core is made of materially larger diameter than the core which it supports, and spacing beams, preferably constructed of non-magnetizable material, are interposed at frequent intervals between the core and the frame. The distance between the outer surface of the laminated core structure and the frame is determined by the space required to avoid interference between the magnetic field set up by the outer half of the windings and the frame which, if permitted, would cause considerable heating. The aforesaid spacing beams are located in radial planes, equally disposed about the outer cylindrical surface of the core member, and are provided with flanged cross strips to which coil-supporting plates may be attached. The armature winding, instead of being of the drum type, as is usual for stationary armatures, is of the ring type, and the conductors from one of the core slots pass, for a short distance, away from the center in radial lines, enter suitable openings in the coil-supporting plates and issue therefrom at the other end of the core. From this point, the conductors pass inwardly along radial lines and enter a slot next adjacent to that from which they came at the opposite end of the core. The windings may, of course, be arranged according to a variety of well known methods, bars, cables or any suitable conductors being employed, and the coils may either be hand-wound in position on the machine or machine-wound and connected after being forced through the slots from one end.

In the accompanying drawings, Figure 1 is an end elevation of a portion of a stationary armature constructed in accordance with my invention, a portion of the frame being broken away to disclose the spacing construction, and Fig. 2 is a sectional elevation on line II—II of Fig. 1. Figs. 3, 4, 5 and 6 are detail views of a spacing beam and Figs. 7 and 8 are detail views of one of the coil-supporting plates shown in Fig. 1.

Referring to the drawings, a cylindrical core member 1 is supported from a frame 2 by means of a plurality of spacing beams 3 which may preferably be constructed of non-magnetizable material. The beams 3 are located in radial planes, equally disposed about the outer cylindrical surface of the core member 1, and are bolted to the frame structure 2.

The core member 1 is composed of magnetizable laminæ which may be held in place by any convenient means, such as dovetail projections 5 thereon and longitudinal slots 6 formed in the inner surfaces of the beams 3, the said member being also provided with suitable slots 4 and ventilating ducts 4ª, in the usual manner. Suitably projecting flanges 7 are provided at the ends and at intermediate points of the beams 3 to which segmental plates 8 are attached. These segmental plates serve to stiffen the structure and to act also as coil supports, being provided with flanged openings 9, the size of which is commensurate with the core slots 4 and the centers of which lie substantially in radial planes through the centers of the slots.

In the winding illustrated in the drawings, which comprises coils 9ª, the conductors from any one of the slots 4 pass away from the center in a radial line, through one set of openings 9, which lie in approximately the same radial plane as the slot, along a substantially radial line toward the center and into the core slot next adjacent to the one from which it came at the opposite end of the core. In this way, the winding when completed, is of the ring type and all its convolutions encircle the core member 1. With the aforesaid construction, the coil ventilation is improved, the space occupied by the winding at the ends of the core is materially reduced and the coils may be easily connected and securely braced.

The space between the outer edge of the coil-supporting plates 8 and the frame structure 2 is sufficient to permit of thorough ventilation of the winding and if the frame structure is closed, ventilation being effected by forced draft, it is desirable to seal up the space at the ends of the beams by riveting thin plates 10, of any suitable material, to the end flanges 7 of the beams 3, as indicated in Figs. 1 and 2. At 11 in Fig. 2, I have shown a two-part block for coil terminals and connectors.

The fact that any of the coils of the ring-wound armature may be easily and quickly repaired without disturbing the uninjured coils may be of the greatest advantage, as generator repairs which necessitate stopping the machine are often confined to a few hours between long periods of uninterrupted service.

Although I have shown a specific structure, I desire that my invention shall not be limited in its scope to such structure, but that variations in size and arrangement of parts which effect substantially the same result shall be included therein.

I claim as my invention:

1. A stationary armature for dynamo-electric machines comprising a frame, a laminated core, coils surrounding said core, non-magnetizable coil-supporting members, and means for connecting said members to the frame independently of the core.

2. In a dynamo-electric machine, the combination with a cylindrical core having longitudinal slots near its inner surface, coils extending through said slots and around the core, and a supporting frame, of core-supporting members attached to said frame, and coil-supporting members attached to said core-supporting members.

3. In a dynamo-electric machine, the combination with a stationary ring-wound armature core, a supporting frame therefor of materially greater diameter than the said core, core-supporting devices interposed between the stationary frame and the armature core, and coil-supporting devices interposed between the core-supporting devices.

4. In a dynamo-electric machine, the combination with a cylindrical core having longitudinal slots near its inner surface, coils extending through said slots and around the core and a stationary supporting frame of materially greater diameter than the core, of a non-magnetizable spacing structure interposed between the cylindrical core and its supporting frame and comprising beams which are suitably disposed about the circumference of the core in substantially radial planes.

5. In a dynamo-electric machine, the combination with a cylindrical core member, a stationary frame which surrounds said member and is of materially greater diameter, of a spacing structure of non-magnetizable material interposed between the stationary frame and the core member and comprising beams suitably disposed about the circumference of the core member in radial planes and segmental coil-supporting plates which interconnect said beams.

6. In a dynamo-electric machine, the combination with a substantially cylindrical, stationary frame structure, beams which are equally disposed about its inner cylindrical surface and are located in radial planes and have longitudinal grooves in their inner surfaces, and a laminated core member having dovetail projections which engage said grooves, of segmental coil-supporting plates which are located in planes perpendicular to the axis of the core and are attached to beams between the core and the frame.

7. In a dynamo-electric machine, the combination with a stationary frame having a cylindrical inner surface, and a ring-wound cylindrical core of materially smaller diameter than the frame, of non-magnetizable spacing brackets located in radial planes between the frame and the core and serving to maintain a concentric relation between said parts, and coil-supporting plates fastened to said brackets.

8. In a dynamo-electric machine, the combination with a stationary frame having a cylindrical inner surface, and a ring-wound cylindrical core member of less diameter than said inner surface, of a set of spacing members fastened to the inner periphery of the frame and to the outer periphery of the core, and coil-supporting plates fastened to said spacing members.

In testimony whereof, I have hereunto subscribed my name this 31st day of March, 1906.

EGBERT M. TINGLEY.

Witnesses:
F. D. NEWBURY,
BIRNEY HINES.